United States Patent [19]

Shetterly

[11] 4,445,923
[45] May 1, 1984

[54] POSITION SENSING DEVICE

[75] Inventor: Donivan M. Shetterly, Toledo, Ohio

[73] Assignee: Owens-Illinois, Inc., Toledo, Ohio

[21] Appl. No.: 454,513

[22] Filed: Dec. 30, 1982

[51] Int. Cl.³ .................... C03B 9/40; G08C 21/00
[52] U.S. Cl. .................................. 65/158; 65/163;
                              65/164; 116/204; 340/686
[58] Field of Search .................... 65/158, 163, 164;
                                          116/204; 340/686

[56]         References Cited
       U.S. PATENT DOCUMENTS

| 4,338,116 | 7/1982 | Huff et al. ................ 65/163 X |
| 4,367,087 | 1/1983 | Franco et al. ............... 65/163 |
| 4,403,219 | 9/1983 | Järvinen ................ 340/686 X |

FOREIGN PATENT DOCUMENTS 783542  9/1957  United Kingdom ............ 116/204

Primary Examiner—Arthur D. Kellogg
Attorney, Agent, or Firm—Gerald T. Welch; Myron E. Click

[57]         ABSTRACT

Apparatus for sensing the position of a mechanism while moving in a direction transverse thereto is disclosed. The apparatus for sensing the position of the mechanism comprises an electrical load, an oscillator having an input connectable in series with the load to a source of direct current, and an electromagnet electrically connected to the output of the oscillator and having a radiating surface opposingly positioned to face the mechanism so that a magnetic field generated thereby radiates in a direction toward a fixed target position through which the mechanism travels. The apparatus also comprises an electrically conductive target having a surface between a leading edge and a lagging edge. The target is mounted on the mechanism so that the leading edge of the target enters the magnetic field as the mechanism moves the target toward the target position. The target is shaped between the edges so that the surface of the target tapers from the leading edge to the lagging edge in a direction toward the electromagnet.

10 Claims, 7 Drawing Figures

POSITION SENSING DEVICE

FIELD OF THE INVENTION

This invention relates to a device for sensing the position of a mechanism while the mechanism is moving in a direction transverse thereto, and more particularly to an apparatus therefor.

BACKGROUND OF THE INVENTION

The individual section or IS glassware forming machine is well known and includes a plurality of sections each having mechanisms for forming articles of glassware in a time sequence of predetermined steps. The forming mechanisms in each section are typically operated by pneumatic motors or actuators. The pneumatic motors are controlled by a valve block which in turn is controlled by an electronic control system having a computer for each individual section such as, for example, the system disclosed in U.S. Pat. No. 4,152,143, granted to W. T. Dowling and D. S. Farkas and assigned to the assignee of the present invention. Individual sections may include a plurality of position sensors coupled to the forming mechanisms to monitor their position as disclosed in U.S. Pat. No. 4,338,116, granted to N. T. Huff et al. The output signals from the sensors are provided to a corresponding individual section computer which processes the output signals.

The position sensors can be inductive proximity sensors, in which case the coupling between the forming mechanism and the position sensor is an electrical conductor mounted on the mechanism. The electrical conductor serves as a target for the magnetic field generated by the sensor. A significant difficulty encountered in using inductive proximity sensors to sense the position of the mechanism is that the target must be positioned more or less accurately in front of the sensor. The accuracy required is determined by the switching range of the sensor/target configuration, i.e., the minimum transfer distance that the target or sensor must move to cause the output of the sensor to change its state. A large switching range is desired in order to make the positioning of the target in front of the sensor noncritical. When using the conventional square-faced target, the switching range of the sensor, i.e., the physical "window" in which the target can be placed, is too small.

SUMMARY OF THE INVENTION

The instant invention is based on the discovery of apparatus for sensing the position of a mechanism while the mechanism is moving in a direction transverse thereto. The apparatus for sensing the position of the mechanism comprises an electrical load, an oscillator having an input connectable in series with the load to a source of direct current, and an electromagnet electrically connected to the output of the oscillator and having a radiating surface opposingly positioned to face the mechanism so that a magnetic field generated thereby radiates in a direction toward a fixed target position through which the mechanism travels. The apparatus also comprises an electrically conductive target having a surface between a leading edge and a lagging edge. The target is mounted on the mechanism so that the leading edge of the target enters the magnetic field as the mechanism moves the target toward the target position. The target is shaped between the edges so that the surface of the target tapers from the leading edge to the lagging edge in the direction toward the electromagnet. When the target enters the magnetic field, the oscillator becomes detuned so that the measurable output voltage across the load decreases. It has been discovered that the switching range of the sensor, or the physical window in which the target can be placed, is extended into a commercially practical range by using the shaped target. It is an object of the invention to cause the measurable output voltage across the load to change its state without the requirement that the target be accurately positioned in an operational environment.

DETAILED DESCRIPTION OF THE INVENTION

Figure 1:
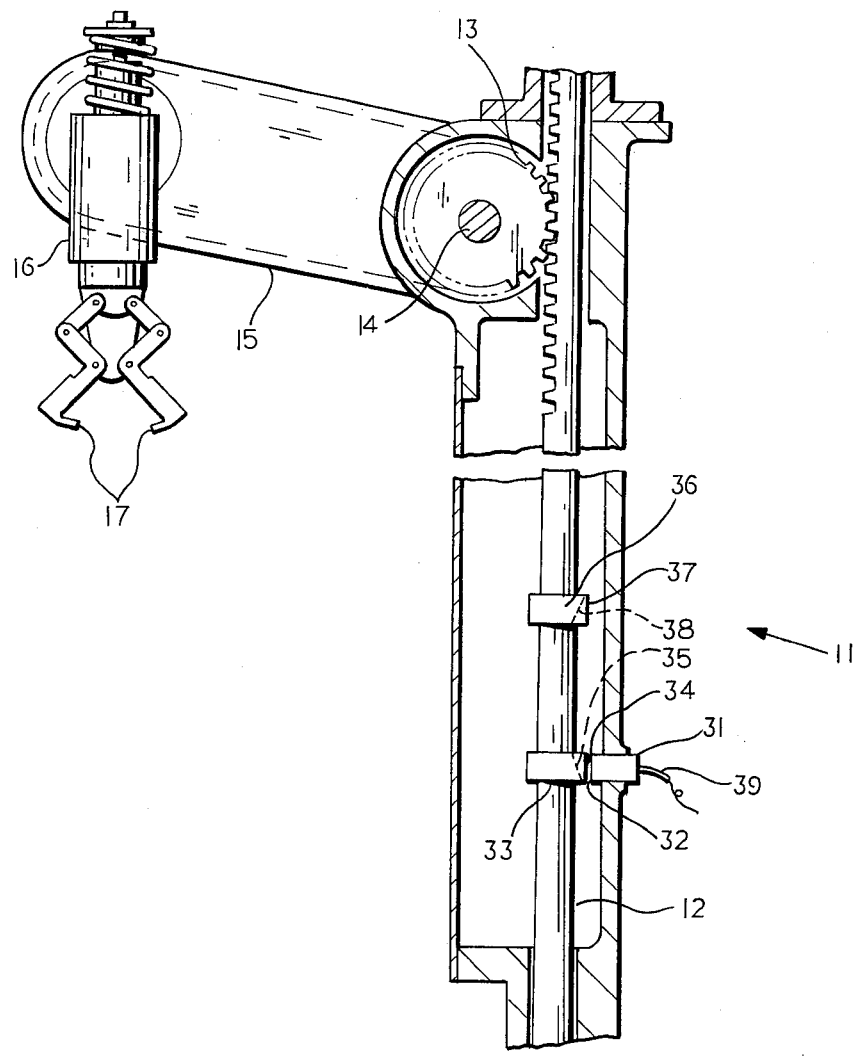
FIG. 1 is a partially schematic view of a sensor and target mounted on a take out mechanism in accordance with the invention.
Figure 2:
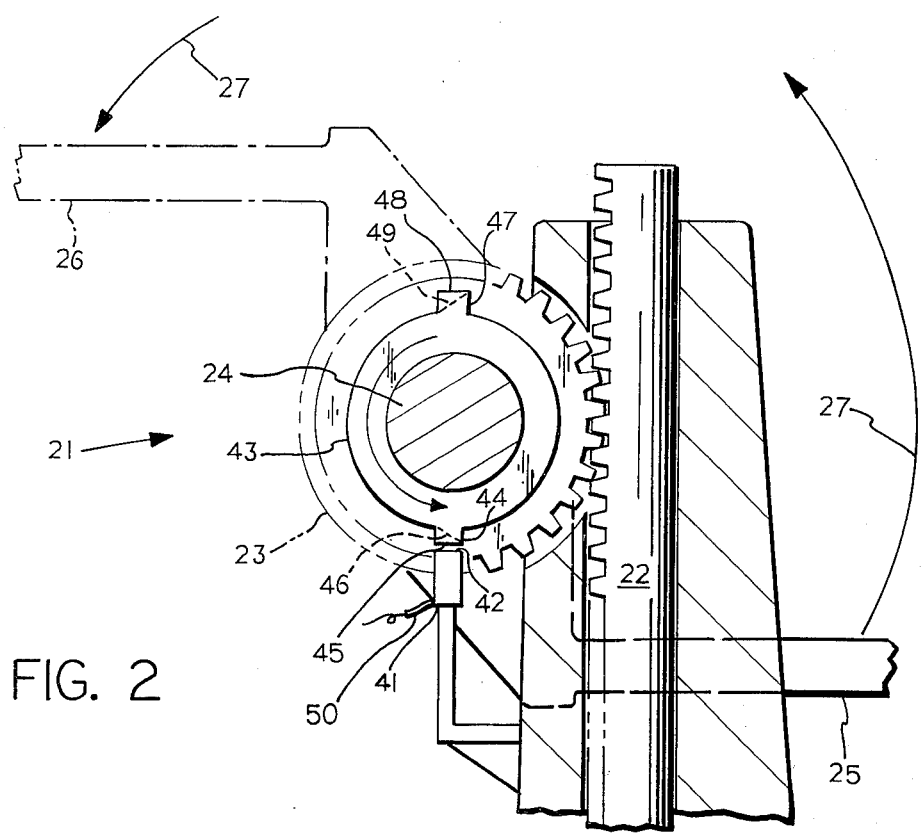
FIG. 2 is a partially schematic view of a sensor and a target mounted on an invert mechanism in accordance with the invention.
Figure 3:
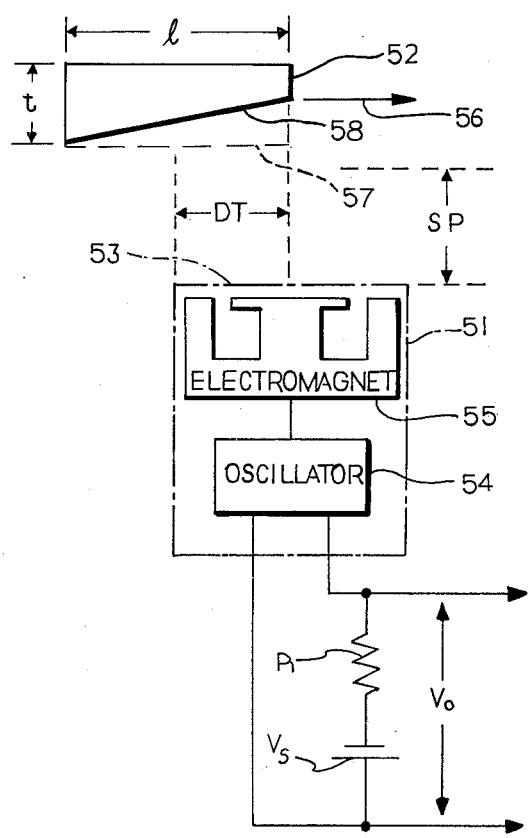
FIG. 3 is a partially schematic view of the sensor and target of FIG. 1 and FIG. 2 and an electrical schematic associated with the sensor in accordance with the invention.

The individual section or IS glassware forming machine is well known and includes a plurality of sections each having mechanisms for forming articles of glassware in a time sequence of predetermined steps. For example, referring to FIG. 1, a takeout mechanism is indicated generally at 11. The takeout mechanism 11 comprises a double-acting pneumatic cylinder (not shown) which actuates a piston-rod rack 12 to rotate a takeout gear 13 around a fixed shaft 14. A tong arm shaft assembly 15 connects the gear 14 to a tong-arm assembly 16. The gear 13 rotates the shaft assembly 15 which moves the tong-arm assembly 16 up and down while maintaining its vertical orientation. The tong-arm assembly 16 supports a pair of takeout tongs 17 which can be actuated to grasp or release a bottle. The takeout mechanism 11 actuates the tong-arm assembly 16 and the takeout tongs 17 to pick up a bottle and transfer it from one position to another. Referring to FIG. 2 for another example, an invert mechanism is illustrated generally at 21. The inverting mechanism 21 also comprises a double acting pneumatic cylinder (not shown) which actuates a piston-rod rack 22 that rotates an invert gear and an invert arm 25 attached thereto around a shaft 24. The upward movement of the piston-rod rack 22 causes the invert arm 25 to rotate from its indicated position to a position indicated by the dashed line 26 along a path defined by an arrow 27. Both the takeout mechanism 11 and the invert mechanism 21 are well known in the glass forming art.

The pneumatic cylinders are ultimately controlled by a valve block (not shown) which is controlled by an electronic control system such as, for example, the one disclosed in U.S. Pat. No. 4,152,143, granted to W. T. Dowling et al and assigned to the assignee of the present invention. The individual sections may include plurality of position sensors each coupled to one of the forming mechanisms to monitor their position as disclosed in U.S. No. Patent 4,338,116 granted to N. T. Huff, et al, assigned to the assignee of the present invention, and hereby incorporated by reference. The output signals from the sensors are provided to an individual section computer in the electronic control system which processes the output signals. The position sensors can be inductive proximity sensors such as, for example, model number BI5-GI8-YO available from Turck, Incorporated, located in Minneapolis, Minn. The coupling between the individual forming mechanism and a proximity sensor is an electrical conductor such as, for example, a piece of steel mounted on the mechanism. For example, referring to FIG. 1, a proximity sensor is indicated at 31 and has a radiating surface 32 opposingly positioned to face the rack 12. The coupling or electrically conductive target 33 is mounted on the rack 12 and has a squared surface 34. The target 33 is positioned on the rack 12 so that it presents itself in front of the sensor 31 at a sensing point indicating that the rack 12 has traveled to its uppermost position and that the takeout arm 15 is in an "OUT" position, as shown, which is when the arm 15 is over the deadplate (not shown). Another target 36 also having a squared surface 37 is positioned on the rack 12 so that it presents itself in front of the sensor 31 at a sensing point indicating that the rack 12 has traveled to its lowermost position and that the takeout arm 15 is in an "IN" position, about 180 degrees clockwise from that shown, which is when the arm 15 is over the mold (not shown). When either of the targets 33 and 36 reach the corresponding sensing point, the sensor 31 which provides an output signal to the IS computer along a wire 39 causes the output signal to change. The radiating surface 32 is opposingly positioned to face the rack 12 so that a magnetic field generated thereby radiates generally perpendicular to the radiating surface 32 and in a direction toward a fixed target position in proximity with the path traveled by the rack 12. The rack 12 moves each target 33 and 36 through the target position along a substantially linear path generally parallel to the radiating surface 32 of the sensor 31. The linear path is generally perpendicular to the direction of radiation toward the target position.

Referring to FIG. 2 for another example, a proximity sensor is indicated at 41 and has a radiating surface 42 opposingly positioned to face the rim of hub 43 concentrically mounted on the invert gear 23. A target 44 having a squared surface 45 is positioned on the rim of the hub 43 so that it presents itself in front of the sensor 41 at a sensing point indicating that the rack 22 has traveled to its lowermost point and that the invert arm 25 is positioned as shown. Another target 47 also having a squared surface 48 is positioned on the rim of the hub 43 so that it presents itself in front of the sensor 41 at a sensing point indicating that the rack 22 has traveled to its uppermost point and that the invert arm 25 is positioned at 26. When either of the targets 44 and 47 reach the corresponding sensing point, the sensor 41 which provides an output signal to the IS computer along a wire 50 causes the output signal to change. The radiating surface 42 of the sensor 41 is opposingly positioned to the squared face 45 of the target 44 when properly positioned so that magnetic field generated thereby radiates in a direction toward a fixed target position in proximity with a path traveled by the rim of the hub 43. The rack 22 moves the targets 44 and 47 through the target position along a curvilinear path having a tangential line at the target position being generally parallel to the radiating surface 42 of the sensor 41. The tangential line is generally perpendicular to the direction of radiation toward the target position.

Referring now in more detail to the construction of the proximity sensors 31 and 41 and the targets 33, 36, 44, and 47 associated therewith, a similar proximity sensor and target are indicated at 51 and 52 respectively. The proximity sensor 51 has a circular radiating surface 53 and comprises a miniature oscillator 54 and an electromagnet 55 electrically connected to the output of the oscillator 54. The electromagnet 55 generates a high frequency oscillating magnetic field through the radiating surface 53 in a direction toward a fixed target position in proximity with a path traveled by the mechanism as indicated by an arrow 56. An input of the oscillator 54 is serially connected to one end of a load resistor R. The other input of the oscillator 54 and the other end of the load resistor R are connected to a source of DC power providing a source voltage $V_s$. The output voltage $V_O$ across the DC power source and the load resistor R is provided to an analog-to-digital converter (not shown) through suitable interfacing electronics (not shown). The converter provides a digital signal to the IS computer which processes the output signals. The target 52 also has a squared face 57 and is made of mild steel having a thickness (t) of at least 1.0 millimeter (0.04 inch). The length (1) of the side of the target 52 is approximately equal to the diameter of the circle inscribed on the active portion of the radiating surface 53 of the sensor 51 or approximately 18 millimeters (0.709 inch). For the sensor 51 to operate properly, the distance between the face 57 of the target 52 and the radiating surface 53 of the sensor 51, i.e., the target-sensor separation SP, must be within a specified range. The maximum separation SP for the sensor 51 to operate with a target 52 is approximately 10.0 millimeters (0.392 inch). The target can be made of other metal such as, for example, stainless steel, mercury, brass, aluminum, and copper. In such case, the maximum separation SP of 10.0 millimeters for mild steel is simply multiplied by a correction factor to obtain the maximum separation SP for the associated target material. The correction factors for the above materials are as follows:

Stainless Steel (depending on alloy): 0.52 to 0.9
Mercury: 0.85
Brass: 0.55
Aluminum: 0.45
Copper: 0.40

Before the target 52 enters the field of the electromagnet 55, the sensor 51 is in an undamped state wherein the internal impedance of the oscillator 54 is low, i.e., approximately 1.0 kohms at approximately 8.2 VDC, and the input current is high, i.e., approximately 2.2 mA. When the target enters the field of the electromagnet 55, the sensor 51 is in a damped state wherein the internal impedance of the oscillator 54 is high, i.e., approximately 8.0 kohms at approximately 0.2 VDC, and the input current is low, i.e., approximately 1.0 mA. The electrically conductive target 52 causes eddy currents to be induced therein which changes the inductance of the electromagnet 55. The inductive change detunes the oscillator 54 which draws less current from the DC power source. As a result, the voltage drop across the load resistor R is also reduced.

Under some circumstances, it may be necessary to increase the supply voltage $V_s$ such as, for example, when significant capacitance exists in parallel with the oscillator 54. Essentially, the increased supply voltage $V_s$ increases the current through the oscillator 54 and the load R to make it more stable. However, increasing the supply voltage $V_s$ may require that the interfacing electronics include a voltage divider for reducing the output voltage $V_O$ to a value compatible with the analog-to-digital converter. Furthermore, in cases where the oscillator frequency or other AC components are present, the interface electronics may require a suitable low pass filter in combination with the voltage divider.

Since proximity sensors normally operate in a configuration wherein the target is moving along a path generally perpendicular to the radiating surface 53 of the sensor 51, the operating parameter is normally the separation SP. However, as described above, the target 52 is moved to the target position along a substantially linear path 56 generally parallel to the radiating surface 53 or along a curvilinear path having a tangential line 56 at the target position being generally parallel to the radiating surface 53. Therefore, the parameter of interest is the distance that the target 52 overlaps or traverses the radiating surface 53 of the sensor 51, i.e., the distance traversed DT. Since it is difficult to accurately position the target 52 in front of the radiating surface 53 of the sensor 51 as it approaches the end of motion for a particular sensing position, the switching range SR of the configuration, i.e., the minimum transverse distance or window within which the target 52 or the sensor 51 must move to cause the output voltage $V_O$ to change state is critically small from an operational point of view. For example, referring to FIG. 4, the output voltage $V_O$ is plotted against the distance traversed DT for various separations SP. For example, the switching range SR at a separation SP of approximately 100 mils is approximately 200 mils, the end points of the switching range SR being defined near the saturation output voltage $V_O$ and the minimum output voltage $V_O$. The 200 mil window starts when the surface 57 of the target overlaps 50 mils of the radiating surface 53 of the sensor 51 and stops when the surface 57 of the target 52 overlaps 250 mils of the radiating surface of the sensor 51. Within that 200 mil window, a change in state is accomplished.

Figure 4:
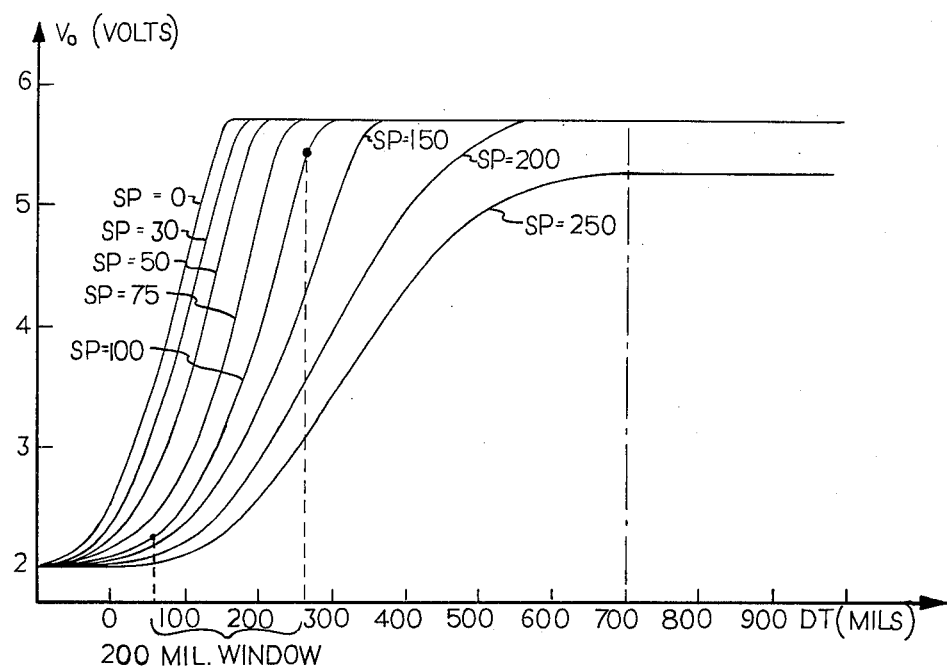
FIG. 4 is a graph of the output voltage of the sensor versus the distance a square-faced target traverses the sensor for different separation distances in accordance with the invention.

However, it has been discovered that the 200 mil window is too small and, therefore, critical. The very rapid response measured by the corresponding sensitivity of 4 volts/100 mils makes positioning the target 52 very difficult since a state change between the saturation output voltage $V_O$ and the minimum output voltage $V_O$ is required. Therefore, a larger switching range SR is necessary in order to make the positioning of the target 52 in front of the sensor 51 noncritical. One way to extend the switching range SR is to increase the separation SP. For example, the switching range SR at a separation SP of 250 mils is approximately a 500 mil window. Although 500 mils approaches a desirable switching range SR, this is about the maximum switching range SR for a square target. In an operational environment, it is desirable to align the target 52 by simply positioning it to completely overlap the radiating surface 53 of the sensor 51. Since the length 1 of the target 52 is approximately 700 mils, the distance traversed DT for alignment is also equal to approximately 700 mils. At that alignment position, the slope of the characteristic curve must be sufficiently large to provide enough resolution or sensitivity, a subject which will be discussed in more detail below. As can be seen in FIG. 4, the slope of the 250 mil characteristic curve is essentially zero at a distance traversed DT of 700 mils. Therefore, for applications requiring a sensitivity suitable for an operational environment, the preferred technique for increasing the switching range SR is to shape the target 52. The result of shaping the target 52 is illustrated in FIG. 5 which shows that the slope of the 150 mil characteristic curve is much greater than zero at a distance traversed DT of 700 mils.

The target 52 is shaped to have a surface 58 which tapers from the leading edge to the lagging edge in a direction toward the radiating surface 53 as the mechanism moves the target 52 through the target position. Referring back to the take-out mechanism 11 in FIG. 1, the target 36 is shaped as indicated by a dashed line 38 so that the shaped surface 38 tapers in a direction toward the radiating surface 32 as rack 12 moves the target 36 through the target position to its lowermost position. Correspondingly, the target 33 is shaped as indicated by a dashed line 35 so that the shaped surface 35 tapers from the leading edge to the lagging edge in a direction toward the radiating surface 32 as the rack 12 moves the target 33 through the target position to its uppermost position. Referring back to the invert mechanism 21 in FIG. 2, the target 47 is shaped as indicated by the dashed line 49 so that the shaped surface 49 tapers from the leading edge to the lagging edge in a direction toward the radiating surface 42 as the hub 43 moves the target 47 through the target position to the position at which the invert arm 25 is shown by the dashed line 26. Correspondingly, the target 44 is shaped as indicated by a dashed line 46 so that the shaped surface 46 tapers from the leading edge to the lagging edge in a direction toward the radiating surface 42 as the hub 43 moves the target 44 through the target position to the position at which the invert arm 25 is now shown. It has been discovered that if the shaped surface 58 of the target 52 is sufficiently tapered, the switching range SR will increase to a noncritical level. More specifically, it has been found that the shaped surface of the target should taper between about 0.1 and 1.0 inch per inch traveled by the target 52 through the target position. In the preferred embodiment, a taper of about 0.2 is used.

Figure 5:
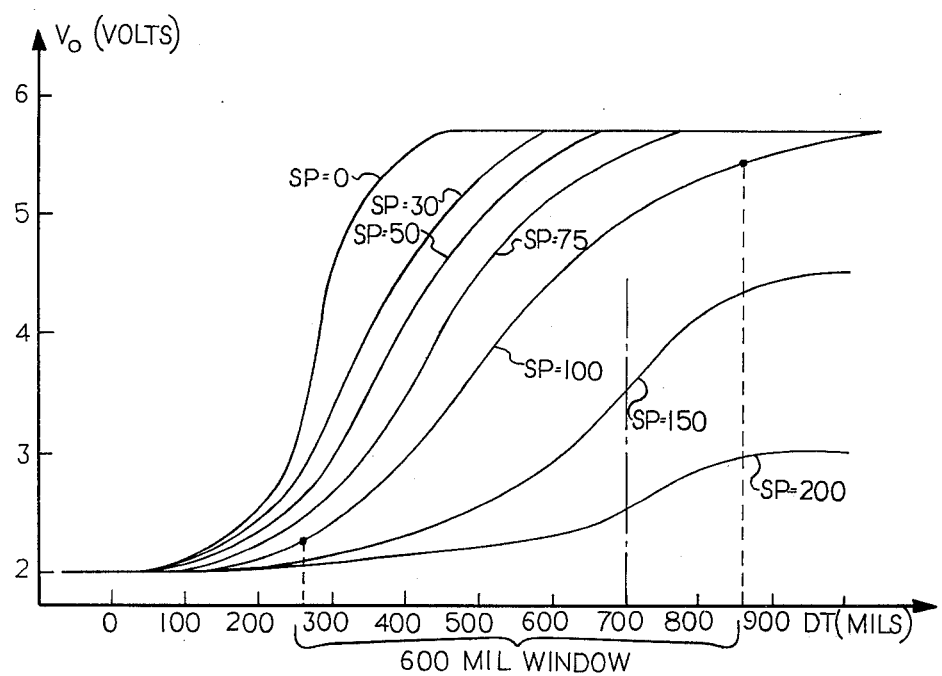
FIG. 5 is a graph of the output voltage of the sensor versus the distance a shaped target traverses the sensor for different separation distances in accordance with the invention.
Figure 6:
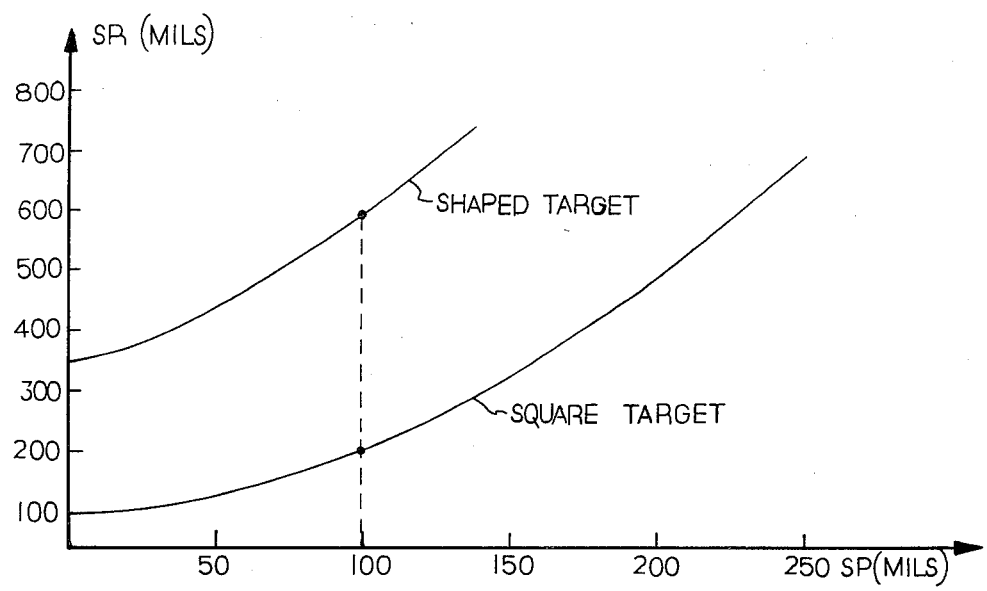
FIG. 6 is a graph of the switching range of a sensor versus the separation distance between the sensor and the target for a square-faced target and a shaped target in accordance with the invention.

Referring to FIG. 5, the output voltage $V_O$ is plotted against the distance traversed DT for different separations SP in response to a target having a shaped surface tapering about 0.2 inch per inch traveled by the target through the target position. As can be seen, the switching range SR or window has been dramatically increased for a similar separation SP of 100 mils. At a 100 mil separation SP the window of the target 52 is about 600 mils wide, extending from the point at which the shaped surface 58 of the target 52 overlaps 200 mils of the radiating surface 53 of the sensor 51 to a point at which the leading edge of the shaped surface 58 of the sensor 52 overlaps 800 mils of the radiating surface 53 of the sensor 51. When comparing FIG. 5 to FIG. 4, it is apparent that the window for the shaped target is approximately three times the distance for the squared target. Therefore, referring to FIG. 6, the size and the switching range SR or the window for a shaped target is much larger than that of a square target for any given separation SP so that proper positioning of the target is no longer critical.

As mentioned above, a slower response or decreased sensitivity is associated with the increased switching range SR. At a separation SP equal to 100 mils, the sensitivity has dropped to approximately 2 volts/100 mils. An objective is to increase the switching range SR while maintaining the minimum level of sensitivity or resolution. The minimum resolution desired in sensing positions of motion on an IS machine is that required to control motions to one half degree in a 360 degree cycle. For a high-speed job running at 4.6 seconds per cycle, the temporal resolution ($\Delta\tau$) required is equal to 0.006 seconds per degree, i.e., 4.6 seconds per cycle divided by 720 half-degrees per cycle. With respect to the takeout mechanism 11, a small movement, $\Delta X$, of the target 33 causes a corresponding change, $\Delta V_O$, in the output voltage $V_O$ according to the following equation:

$$\Delta V_O = S \Delta X$$

where S is the sensitivity of the sensor 31 expressed as volts/100 mil. The small movement, $\Delta X$, of the target 33 is equal to its velocity ($v^1$) times the change in time ($\Delta t$) or the velocity (v) of the takeout tongs 17 times the change in time ($\Delta t$) adjusted by the mechanical disadvantage (m) associated with this linkage, i.e., $v\Delta t/m$. Thus, the output voltage change $\Delta V_O$ can be expressed according to the following equation:

$$\Delta V_O = Sv\Delta t/m.$$

The analog-to-digital converter, to which the output voltage $V_O$ is applied, also has a characteristic sensitivity R expressed in count/volts so that the output voltage change $\Delta V_O$ can be related to the digital output change $\Delta C$ according to the following equation:

$$\Delta C = R \Delta V_O = RSv\Delta t/m$$

where $\Delta C$ is expressed as digital counts.

To determine the time resolution of the system, it is necessary to determine how small a mechanism motion time interval, $\Delta t$, can be resolved. Thus, if during a time interval, $\Delta T$, the rack 12 moves so as to cause a change in $\Delta C$ of less than a predetermined value $C_n$ where $C_n$ is the noise level of the system, the movement cannot be differentiated from the noise. Therefore, when $\Delta C$ is equal to $C_n$, $\Delta T$ is the time resolution of the mechanism which can be expressed according to the following equation:

$$\Delta T = m\, C_n/RSv.$$

The system meets the requirements if the mechanism resolution $\Delta T$ is less than or equal to temporal resolution, $\Delta\tau$, of 0.006 seconds. For the takeout mechanism 11, the mechanical disadvantage m is equal to approximately 6. The noise level $C_n$ of the analog-to-digital converter is approximately 10 counts. The analog-to-digital sensitivity R is 409.6 counts per volt. The velocity (v) of the takeout tongs 17 near the end of the stroke is about 4 inches per second. Since the sensitivity S of the sensor/target configuration at a separation SP of 100 mils is approximately 20 volts per inch, the mechanism resolution T is equal to 0.0018 seconds which is easily better than the required temporal resolution, $\Delta\tau$, of 0.006 seconds. Other mechanisms of the IS machine can be evaluated in a similar fashion. Therefore, it can be seen that the switching range SR or the window can greatly be increased by using a shaped target without detrimentally reducing the sensitivity of the system.

Figure 7:
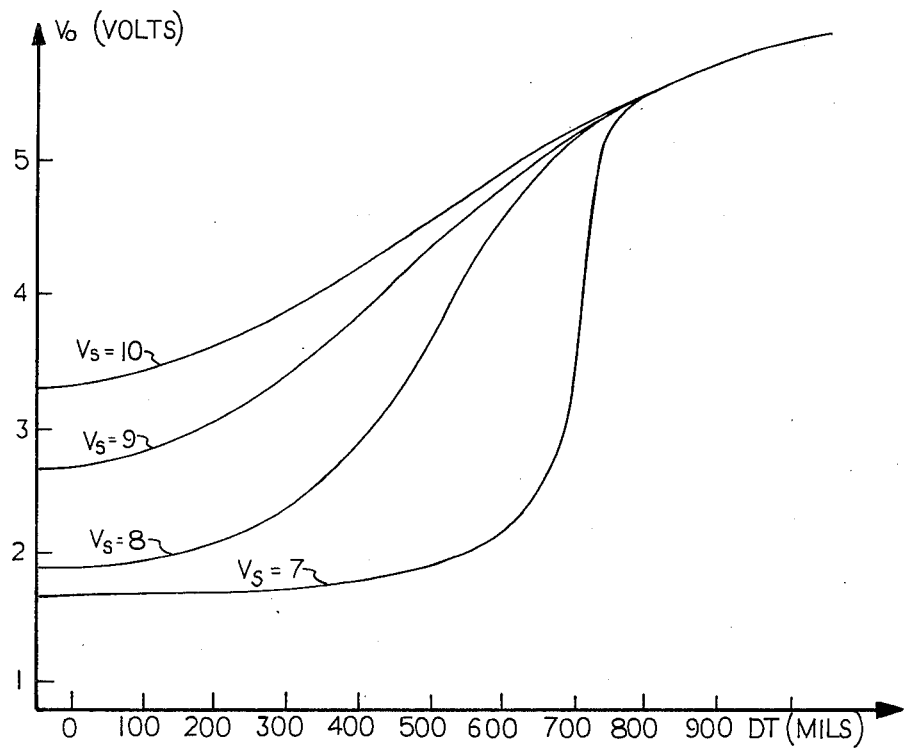
FIG. 7 is a graph of the output voltage of the sensor versus the distance a shaped target traverses the sensor for different supply voltages in accordance with the invention.

The switching range SR is further affected by the load resistance R and the supply voltage $V_s$. Referring to FIG. 7, the output voltage $V_O$ is plotted against the distance the target 52 overlaps the radiating surface 53 for different supply voltages $V_s$ for a shaped target. For a given load resistance R, the supply voltage $V_s$ was adjusted until the maximum output voltage $V_O$max, i.e. the saturation voltage, was approximately 6 volts. As can be seen, the choice of a supply voltage $V_s$ equal to 8 volts will yield approximately the maximum switching range SR. Larger loads R and consequently larger supply voltages $V_s$ result in very little extension of the switching range SR.

The foregoing disclosure is the best mode devised by the inventor for practicing this invention. It is apparent, however, to one skilled in the pertinent art that various changes may be made in details of construction from those shown in the attached drawings and discussed in conjunction therewith without departing from the spirit and scope of this invention. For example, the proximity sensor 51 can have a single radiating surface 58 as shown, which is the preferred embodiment, or at least a principal radiating surface and adjacent spurious radiating surfaces nonessential to the operation of the sensor 51. The detail in the foregoing disclosure is intended to enable one skilled in the pertinent art to practice the instant invention. Therefore, it is to be understood that this invention is not to be limited to the specific details shown and described.

What I claim is:

1. In a glassware forming machine having mechanisms for forming articles of glassware from gobs of molten glass in a timed series of predetermined forming steps in response to a plurality of control signals, apparatus for sensing the position of a mechanism associated with one of the forming steps comprising:
   an electrical load;
   an oscillator having an input connectable in series with said load to a source of direct current;
   an electromagnet electrically connected to the output of said oscillator and having a principal radiating surface from which a magnetic field emanates in a direction toward a fixed target position in proximity with a path traveled by the mechanism; and
   an electrically conductive target having a leading edge, a lagging edge, and a cutting face therebetween opposingly facing the principal radiating surface of said electromagnet, said target being mounted on the mechanism so that the leading edge of said target enters the magnetic field as the mechanism moves said target toward the target position and being shaped between the edges so that the cutting face of said target tapers from the leading edge to the lagging edge in a direction toward said electromagnet, the taper of said target being determined when the cutting face of said target opposingly faces the principal radiating surface of said electromagnet, whereby said oscillator becomes detuned as the cutting face of said target enters the magnetic field to reduce the measurable output voltage across said load.

2. Apparatus for sensing the position of a mechanism comprising:

an electrical load;

an oscillator having an input connectable in series with said load to a source of direct current;

an electromagnet electrically connected to the output of said oscillator and having a principal radiating surface from which a magnetic field emanates in a direction toward a fixed target position in proximity with a path traveled by the mechanism; and an electrically conductive target having a leading edge, a lagging edge, and a cutting face therebetween opposingly facing the principal radiating surface of said electromagnet, said target being mounted on the mechanism so that the leading edge of said target enters the magnetic field as the mechanism moves said target toward the target position and being shaped between the edges so that the cutting face of said target tapers from the leading edge to the lagging edge in a direction toward said electromagnet, the taper of said target being determined when the cutting face of said target opposingly faces the principal radiating surface of said electromagnet, whereby said oscillator becomes detuned as the cutting face of said target enters the magnetic field to reduce the measurable output voltage across said load.

3. Apparatus as recited in claims 1 or 2 wherein the cutting face of said target is sufficiently tapered toward the principal radiating surface of said electromagnet so that the size of the reduction of the measurable output voltage is increased to a switching range greater than a predetermined value.

4. Apparatus as recited in claims 1 or 2 wherein the cutting face of said target has a taper between about 0.1 and 1.0 inch per inch traveled by said target through the target position 5. Apparatus as recited in claims 1 or 2 wherein said electrical load is a resistor.

6. Apparatus as recited in claims 1 or 2 wherein the mechanism moves said target through the target position along a substantially linear path generally parallel to the radiating surface of said electromagnet.

7. Apparatus as recited in claim 6 wherein the linear path is generally perpendicular to the direction of radiation toward the target position.

8. Apparatus as recited in claims 1 or 2 wherein the mechanism moves said target through the target position along a curvilinear path having a tangential line at the target position being generally parallel to the radiating surface of said electromagnet.

9. Apparatus as recited in claim 8 wherein the tangential line is generally perpendicular to the direction of radiation toward the target position.

10. Apparatus as recited in claims 1 or 2 wherein the voltage provided by the source of direct current is set at a predetermined value to maximize the size of the reduction of the measurable output voltage.

* * * * *